(12) United States Patent
Komori et al.

(10) Patent No.: US 10,800,120 B2
(45) Date of Patent: Oct. 13, 2020

(54) TYRE MOLD, METHOD FOR MANUFACTURING TYRE, AND TYRE

(71) Applicant: Sumitomo Rubber Industries, Ltd., Kobe-shi, Hyogo (JP)

(72) Inventors: Yosuke Komori, Kobe (JP); Ryuhei Sanae, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 16/521,309

(22) Filed: Jul. 24, 2019

(65) Prior Publication Data

US 2020/0039159 A1    Feb. 6, 2020

(30) Foreign Application Priority Data

Aug. 1, 2018   (JP) .................................. 2018-145259

(51) Int. Cl.
*B29D 30/06* (2006.01)
*B29C 33/00* (2006.01)
*B60C 11/03* (2006.01)

(52) U.S. Cl.
CPC ........ *B29D 30/0606* (2013.01); *B29C 33/005* (2013.01); *B29D 30/0629* (2013.01); *B29D 2030/0607* (2013.01); *B60C 11/03* (2013.01)

(58) Field of Classification Search
CPC ... B29D 30/0629; B29C 33/005; B60C 11/03; B60C 2011/0337
See application file for complete search history.

(56) References Cited

U.S. PATENT DOCUMENTS

| 3,000,421 A | | 9/1961 | Hack et al. | |
|---|---|---|---|---|
| 4,411,175 A | * | 10/1983 | Takahashi | B29D 30/0606 29/416 |
| 5,234,326 A | * | 8/1993 | Galli | B29C 33/10 425/46 |
| 5,290,163 A | * | 3/1994 | Katsumata | B29D 30/0629 425/183 |

(Continued)

FOREIGN PATENT DOCUMENTS

| DE | 1933816 A1 | | 1/1971 |
|---|---|---|---|
| EP | 440040 | * | 1/1991 |

(Continued)

OTHER PUBLICATIONS

Extended European Search Report, dated Jan. 13, 2020, for European Application No. 19187817.2.

*Primary Examiner* — James P Mackey
(74) *Attorney, Agent, or Firm* — Birch, Stewart, Kolasch & Birch, LLP

(57) ABSTRACT

A tyre mold for curing and molding a tyre includes a plurality of tread segments for molding a tread rubber of the tyre. The plurality of tread segments, upon being connected with one another in a mold circumferential direction, forms a tread molding-surface that is substantially continuous in the mold circumferential direction through parting lines that appear between adjacent tread segments. The parting lines include one or more inclined parting lines inclined with respect to a mold axial direction, and the inclined parting lines extend straightly between ends in the mold axial direction of the tread molding-surface.

22 Claims, 3 Drawing Sheets

(56) References Cited

U.S. PATENT DOCUMENTS

| | | | |
|---|---|---|---|
| 6,416,304 B1* | 7/2002 | Tanaka | B29C 33/10 |
| | | | 425/28.1 |
| 7,290,996 B2* | 11/2007 | Tanaka | B29D 30/0629 |
| | | | 425/28.1 |
| 7,377,761 B2* | 5/2008 | Tanaka | B29C 33/302 |
| | | | 425/46 |
| 7,670,124 B2* | 3/2010 | Hyodo | B29D 30/0629 |
| | | | 425/46 |
| 8,127,822 B2* | 3/2012 | Hyodo | B29D 30/0629 |
| | | | 164/137 |
| 9,492,980 B2* | 11/2016 | Kawagoe | B29C 33/02 |
| 2013/0292016 A1* | 11/2013 | Roty | B29D 30/0629 |
| | | | 152/209.1 |
| 2017/0001394 A1* | 1/2017 | Brown, IV | B29D 30/06 |
| 2018/0297306 A1* | 10/2018 | Ishihara | B29C 35/02 |

FOREIGN PATENT DOCUMENTS

| | | |
|---|---|---|
| EP | 1232643 A2 | 8/2012 |
| EP | 2993018 A1 | 3/2016 |
| JP | 2005-246931 A | 9/2005 |
| WO | WO 2015/084383 A1 | 6/2015 |

* cited by examiner

TYRE MOLD, METHOD FOR MANUFACTURING TYRE, AND TYRE

BACKGROUND ART

Field of the Disclosure

The present disclosure relates to a tyre mold for curing and molding a tyre, a method for manufacturing a tyre using the tyre mold and a tyre cured and molded using the tyre mold.

Description of the Related Art

Conventionally, it has been known that tyres having tread portions are molded and cured using tyre molds. Tyre molds for curing and molding tyres, for example, include a plurality of tread segments arranged in the mold circumferential direction for molding tread rubber. The tread segments, upon being connected with one another in the mold circumferential direction, form a tread molding-surface that is substantially continuous in the mold circumferential direction through parting lines that appear between adjacent tread segments.

For example, in order to design an optimized tyre mold, the following Patent document 1 has proposed a tyre mold having an optimized dividing layout of the plurality of tread segments (locations of the parting lines) based on a pitch layout defined by the tread design.

PATENT DOCUMENT

[Patent document 1] Japanese Unexamined Patent Application Publication 2005-246931

SUMMARY OF THE DISCLOSURE

The tyre mold disclosed in Patent document 1 includes the parting lines which extend along the mold axial direction. Thus, when a tyre cured and molded by the tyre mold travels on the ground, each transverse line molded by a respective one of the respective parting lines comes into contact with the ground at the same time in the tyre axial direction, resulting in deteriorating radial force variation property of the tyre. Tyres having deteriorated radial force variation property are prone to be worn out locally as well as cause large vibration and noise, and thus there has been a possibility that uneven wear resistance and noise performance tends to be low.

On the other hand, it may be possible to modify the tyre mold disclosed in Patent document 1 in such a way that the parting lines curve or bend, for example. In this case, the molded tyre, when traveling on the ground, may disperse input received from the ground through each portion molded by the parting lines. However, such a tyre mold having curved parting lines with accuracy is difficult to product, thus resulting in increase of tyre manufacturing cost.

The present disclosure has been made in view of the above circumstance, and has a major object to provide a tyre mold capable of manufacturing tyres having improved uneven wear resistance and noise performance while reducing manufacturing cost therefor.

In one aspect of the disclosure, a tyre mold for curing and molding a tyre, the tyre mold includes a plurality of tread segments for molding a tread rubber of the tyre. The plurality of tread segments, upon being connected with one another in a mold circumferential direction, forms a tread molding-surface that is substantially continuous in the mold circumferential direction through parting lines that appear between adjacent tread segments. The parting lines include one or more inclined parting lines inclined with respect to a mold axial direction, and the inclined parting lines extend straightly between ends in the mold axial direction of the tread molding-surface.

In another aspect of the present disclosure, the tread segments each may be provided on the tread molding-surface with one or more protrusions protruding inwardly in a mold radial direction, the protrusions may include one or more main protrusions extending in the mold circumferential direction and one or more auxiliary protrusions extending in a direction crossing the main protrusions, and the inclined parting lines may extend without crossing the auxiliary protrusions.

In another aspect of the present disclosure, the inclined parting lines may be inclined at an angle equal to or less than 20 degrees with respect to the mold axial direction.

In another aspect of the present disclosure, the inclined parting lines may include at least one first inclined parting line inclined in a first direction with respect to the mold axial direction and at least one second inclined parting line inclined in a second direction opposite to the first direction.

In another aspect of the present disclosure, the parting lines may include at least two kinds of inclined parting lines inclined at different angles from one another with respect to the mold axial direction.

In another aspect of the present disclosure, the parting lines may include one or more non-inclined parting lines that extend straightly parallel to the mold axial direction.

In another aspect of the present disclosure, the parting lines may include a pair of parting lines arranged adjacently in the mold circumferential direction, and the pair of parting lines may be different in angle from one another with respect to the mold axial direction.

In another aspect of the present disclosure, a difference between angles of the pair of parting lines may be equal to or less than 23 degrees.

In another aspect of the present disclosure, a number of the tread segments may be from 8 to 13.

In another aspect of the present disclosure, a number of the inclined parting lines may be equal to or more than 50% of a number of the tread segments.

In another aspect of the disclosure, a method for manufacturing a tyre, the method includes curing and molding a tire using the tyre mold as described above.

In another aspect of the disclosure, a tyre includes a tread rubber molded and cured using the tyre mold as described above, the tread rubber being provided with transverse lines molded by the parting lines, wherein the transverse lines comprise one or more inclined transverse lines inclined with respect to a tire axial direction.

DESCRIPTION OF THE PREFERRED EMBODIMENTS

Figure 1:
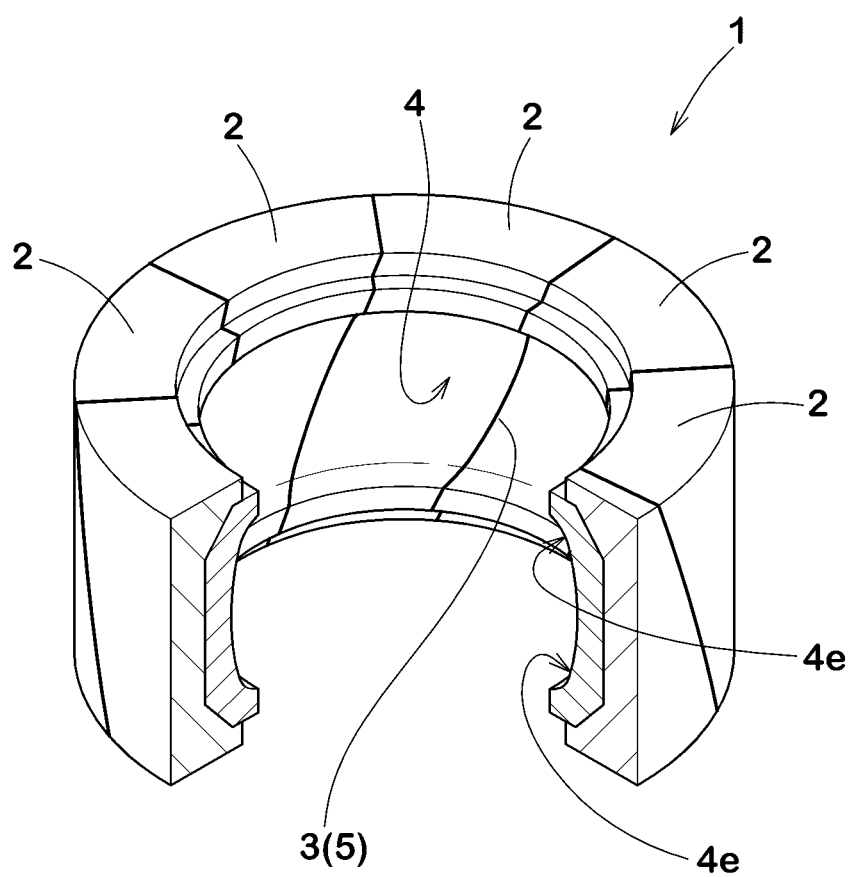
FIG. 1 is a perspective view of a tyre mold under a closed state in accordance with the present disclosure.
Figure 2:
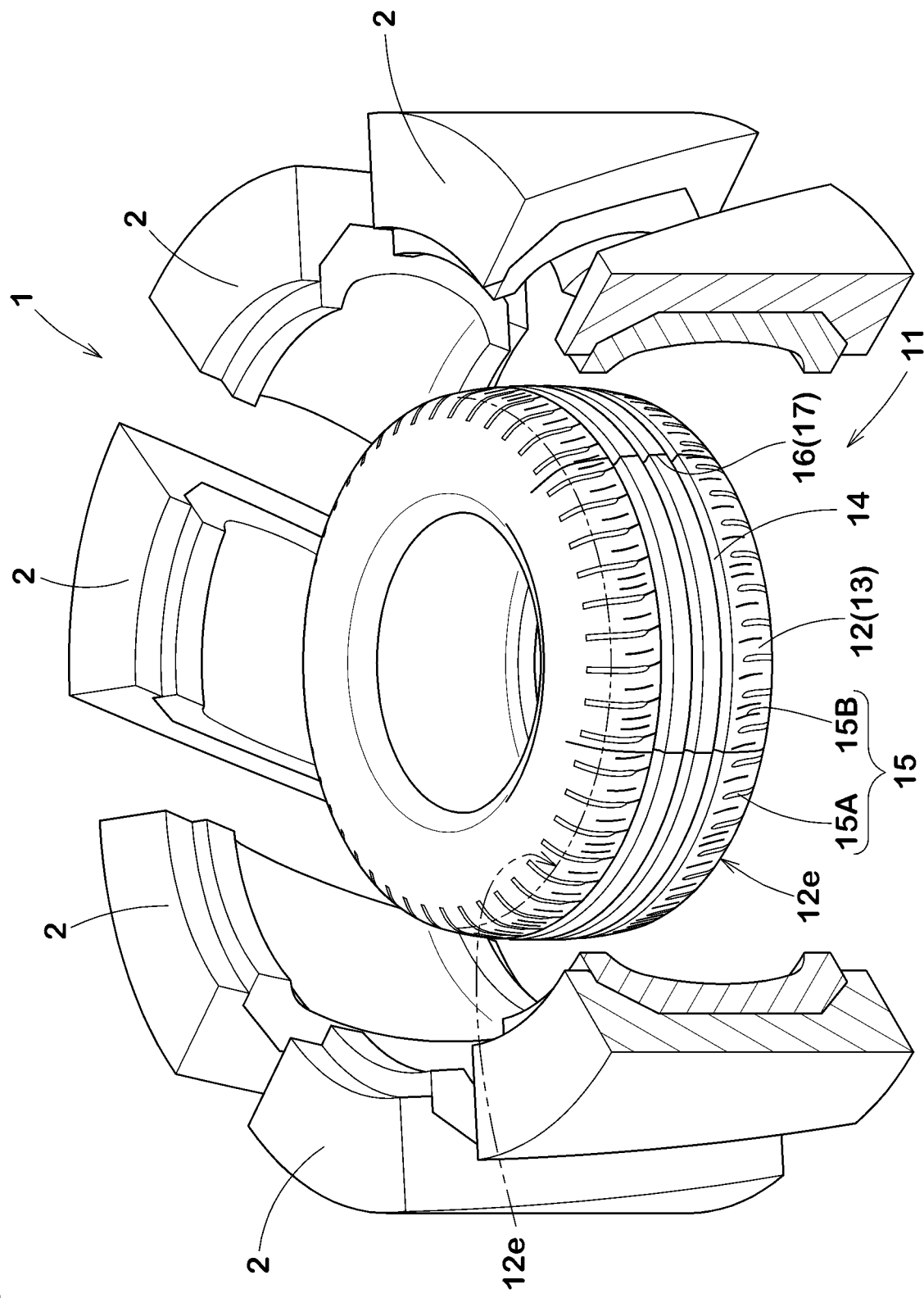
FIG. 2 is a perspective view of the tyre mold under an opened state and a tyre which was cured and molded by the tyre mold.

An embodiment of the present disclosure will be explained below with reference to the accompanying drawings. FIG. 1 is a perspective view of a tyre mold 1 under a closed state in accordance with the present disclosure, and FIG. 2 is a perspective view of the tyre mold 1 under an opened state and a tyre 11 which was cured and molded by the tyre mold 1. FIG. 1 and FIG. 2 illustrate partial perspective views of the tyre mold 1 where some portions are omitted. The tyre 11, for example, may be embodied as various kinds of tyres, e.g., pneumatic tyres for passenger car and heavy-duty vehicle, and non-pneumatic tyres that are not supported by air pressure. In the present embodiment, the tyre 11 is preferably embodied as a pneumatic tyre for passenger car.

As illustrated in FIG. 1 and FIG. 2, the tyre mold 1 is used for curing and molding the tyre 11. The tyre mold 1 according to the present embodiment includes a plurality of tread segments 2 for molding a tread rubber 13 of the tread portion 12 of the tyre 11. Preferably, the plurality of tread segments 2, upon being connected with one another in the mold circumferential direction, forms a tread molding-surface 4 that is substantially continuous in the mold circumferential direction through parting lines 3 that appear between adjacent tread segments 2. As used herein, "substantially continuous" in the mold circumferential direction shall mean to allow a discontinuous situation where an inescapable minute gap exists at the parting lines 3.

The parting lines 3 according to the present embodiment include one or more inclined parting lines 5 which are inclined with respect to the mold axial direction. The inclined parting lines 5 mold a tyre including inclined transverse lines. When the tyre 11 travels on the ground, each of the inclined transverse lines molded by the respective inclined parting lines 5 comes into contact with the ground gradually in the tyre axial direction, enabling to disperse input received from the ground through the inclined transverse lines. Thus, the inclined parting lines 5 make it possible to improve force variation property of the cured and molded tyre 11. Therefore, the tyre mold 1 in accordance with the present disclosure can provide molded and cured tyres 11 having improved uneven wear resistance and noise performance.

Figure 3:
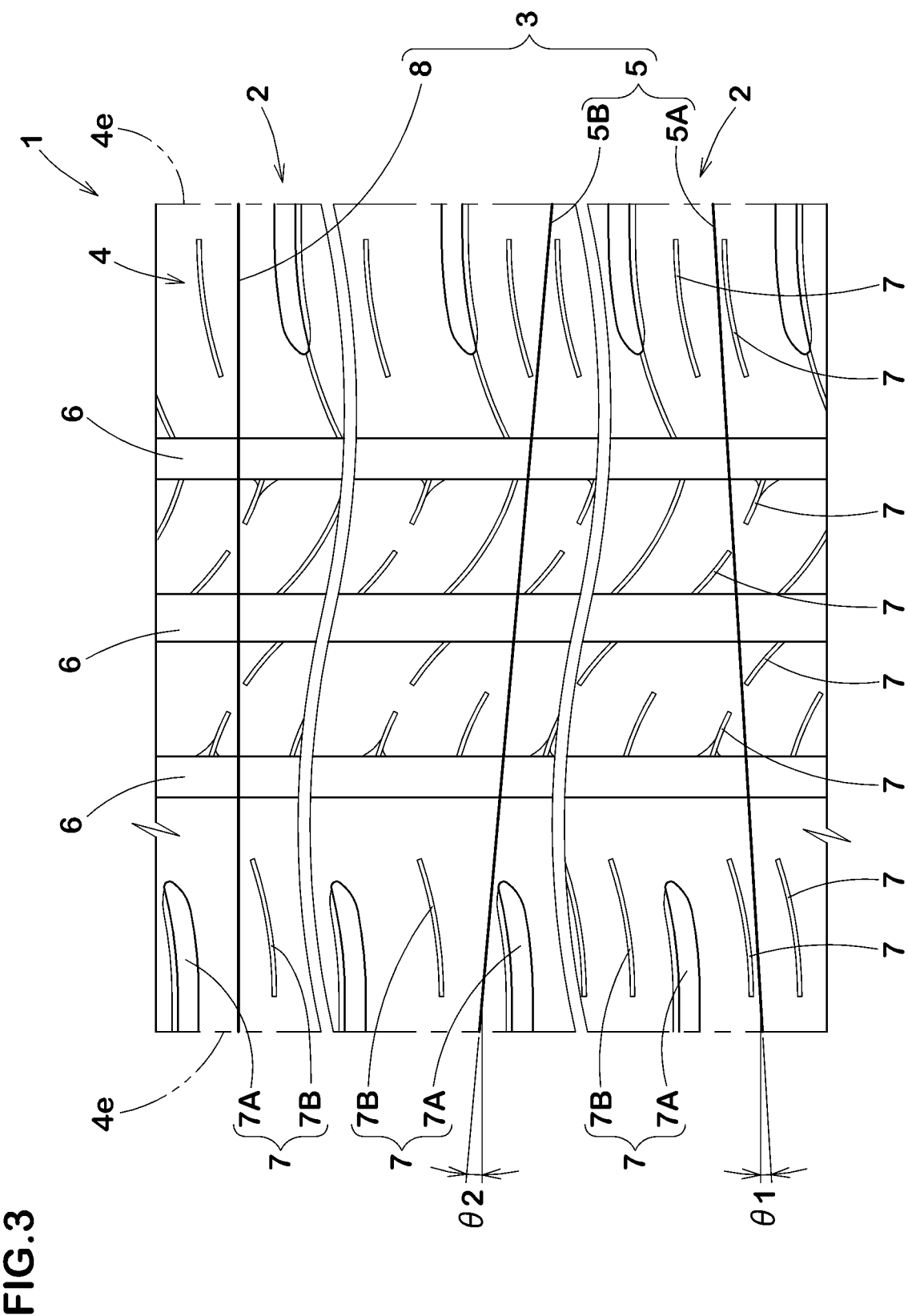
FIG. 3 is a development view of a tread-molding surface.

Preferably, the inclined parting lines 5 extend straightly between ends 4e in the mold axial direction of the tread molding-surface 4. Specifically, the inclined parting lines 5 extend straightly over the entire width in the mold axial direction of the tread molding-surface 4 in a development view of the tread molding-surface 4 as illustrated in FIG. 3. Such inclined parting lines 5 facilitate to process and maintenance themselves, reducing manufacturing cost of the tyre 11. Thus, the tyre mold 1 according to the present embodiment can manufacture tyres having improved uneven wear resistance and noise performance while reducing manufacturing cost therefor.

As used herein, the ends 4e of the tread-molding surface 4 are positions that form tread edges 12e of the tread portion 12 of the tyre 11. The tread edges 12e are the axial outermost edges of the ground contact surface of the tyre 11 which occurs under a normal state of the tyre loaded with a standard tyre load when the camber angle of the tyre is zero.

As used herein, the normal state is such that the tyre 11 is mounted on a standard wheel rim with a standard pressure but loaded with no tyre load.

The standard wheel rim is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre 1 is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, the standard tyre load is a tyre load officially approved or recommended for the tyre 1 by standards organizations, wherein the standard load is the "maximum load capacity" in JATMA, the maximum value given in the above-mentioned table in TRA or the like, and the "LOAD CAPACITY" in ETRTO.

Next, a preferred aspect of the tyre 11 which is molded and cured using the tyre mold 1 according to the present embodiment will be described below. The tyre 11 according to the present disclosure includes the tread portion 12. The tread portion 12 includes a tread rubber 13 which is molded and cured by the tyre mold 1 including the tread segments 2. The tread rubber 13, for example, is provided with a plurality of circumferentially extending main grooves 14 and recesses 15 extending in a direction crossing the main grooves 14. The main grooves 14 and the recesses 15 are recessed inwardly in the tyre radial direction from a tread contact surface 12A that is molded by the tread-molding surface 4.

The main grooves 14 according to the present embodiment extend straightly continuously in the tyre circumferential direction. The main grooves 14, for example, may extend in a zigzag manner in the tyre circumferential direction. In addition, the main grooves 14 may extend intermittently in the tyre circumferential direction.

The recesses 15, for example, include lateral grooves 15A and sipes 15B both of which are inclined with respect to the tyre axial direction. The main grooves 14 and the recesses 15 are designed so as to improve various performance of the tyre 11, e.g., steering stability, wet performance, uneven wear resistance, ride comfort, noise performance, and fuel efficiency in a well-balanced manner. Note that some sipes 15B are omitted in FIG. 2.

The tread rubber 13 of the tyre 11 is provided on portions corresponding to the parting lines 3 between the tread segments 2 with a plurality of transverse lines 16 which extends in the tyre axial direction along the parting lines 3. Here, the transverse lines 16 are lines that are molded inescapably on the tread contact surface 12A upon being cured and molded, and which extend so as to traverse the tread contact surface 12A. The transverse lines 16, for example, are molded so as to protrude slightly from the tread contact surface 12A.

In the present embodiment, the transverse lines 16 include one or more inclined transverse lines 17 extending along the inclined parting lines 5. Note that some part of the transverse lines 16 are illustrated in FIG. 2. When the tyre 11 travels on the ground, each inclined transverse line 17 comes into contact with the ground gradually from its one end to the other end in the tyre axial direction, thus dispersing input from the ground. Such inclined transverse lines 17 can reduce radial force variation of the tyre 11 and suppress vibration, noise and uneven wear of the tyre 11, thus improving uneven wear resistance and noise performance of the tyre 11.

The inclined transverse lines 17 according to the embodiment are molded without crossing the recesses 15. Thus, the tyre 11 can employ a layout of the recesses 15 as a whole which was previously designed based on the above-mentioned performance. Hence, in the tread portion 12, there is no risk of a partial excess of rigidity which is caused by the inclined transverse lines 17 provided on the recesses 15. Thus, the inclined transverse lines 17 according to the present disclosure can be helpful to uniformize rigidity distribution of the tyre 11. Such inclined transverse lines 17 can reduce radial force variation of the tyre 11, resulting in further improving uneven wear resistance and noise performance of the tyre 11. Further, since the inclined transverse lines 17 do not cross the recesses 15, the tyre can improve appearance.

Next, a yet preferred embodiment of the tyre mold 1 will be described below. FIG. 3 is a development view of the tread-molding surface 4 of the tyre mold 1. As illustrated in FIG. 2 and FIG. 3, in the tyre mold 1 according to the present embodiment, the tread segments 2 are provided with main protrusions 6 and auxiliary protrusions 7 for molding the main grooves 14 and the recesses 15, respectively, on the tread rubber 13 of the tyre 11. The main protrusions 6, for example, extend in the mold circumferential direction. The auxiliary protrusions 7, for example, extend in a direction crossing the main protrusions 6. The main protrusions 6 and the auxiliary protrusions 7 protrude inwardly in the mold radial direction from the tread-molding surface 4, for example. Note that the main protrusions 6 and the auxiliary protrusions 7 are not illustrated in FIG. 1 and FIG. 2.

As for the main protrusions 6, shapes which are designed to correspond to the main grooves 14 of the tyre 11 are employed. In addition, the auxiliary protrusions 7 preferably include first auxiliary protrusions 7A for molding the lateral grooves 15A and second auxiliary protrusions 7B for molding the sipes 15B.

The inclined parting lines 5 according to the present disclosure extend without crossing the auxiliary protrusions 7. Thus, the auxiliary protrusions 7 can use a layout of the recesses 15 as a whole which was previously designed based on the above-mentioned performance. Hence, the inclined parting lines 5 can suppress a partial excess of rigidity of the tyre 11 to be molded and cured, enabling to uniformize rigidity distribution. Such inclined parting lines 5 can improve force variation property of the tyre 11 to be molded and cured, resulting in further improving uneven wear resistance and noise performance of the tyre 11.

The auxiliary protrusions 7 according to the present embodiment are arranged using a plurality kinds of pitches in the mold circumferential direction. Preferably, the plurality kinds of pitches are arranged in random in the mold circumferential direction. Such auxiliary protrusions 7 can reduce pattern noise due to a tread pattern of the tyre 11 to be molded and cured, improving noise performance of the tyre 11 further.

Preferably, the parting lines 3 include at least two kinds of inclined parting lines 5 inclined at different angles from one another with respect to the mold axial direction. When the tyre 11 molded and cured by the tyre mold 1 travels on the ground, the inclined transverse lines 17 which were molded by the inclined parting lines 5 can disperse input received from the ground, thus improving uneven wear resistance and noise performance of the tyre 11 further. In addition, such inclined parting lines 5, in associate with the auxiliary protrusions 7 arranged at the plurality kinds of pitches, can be helpful to avoid crossing the auxiliary protrusions 7.

When an angle of the inclined parting lines 5 with respect to the mold axial direction becomes large, balance of the tyre mold 11 upon being closed tends to deteriorate, large burrs may be molded on the molded tyre along the transverse lines 16. Thus, the appearance of the tire may be deteriorated. In addition, when an angle of the inclined parting lines 5 with respect to the mold axial direction becomes large, straight-traveling stability of the molded and cured tyre 11 is prone to decrease, resulting in not achieving steering stability to be expected when designed.

From these viewpoints, it is preferable that the inclined parting lines 5 are inclined at angles $\theta 1$ and $\theta 2$ equal to or less than 20 degrees, more preferably equal to or less than 11.5 degrees with respect to the mold axial direction. Hence, the inclined transverse lines 17 of the molded and cured tyre 11 are also inclined at angles equal to or less than 20 degrees, more preferably equal to or less than 11.5 degrees with respect to the tyre axial direction.

The parting lines 3, for example, may include one or more non-inclined parting lines 8 that extend straightly parallel to the mold axial direction. Such non-inclined parting lines 8 facilitate to process and maintenance themselves, reducing manufacturing cost of the tyre 11.

The parting lines 3 include a pair of parting lines arranged adjacently in the mold circumferential direction, wherein the pair of parting lines is preferably different in angle from one another with respect to the mold axial direction. The pair of parting lines 3, for example, may include one of the inclined parting lines 5 and one of the non-inclined parting lines 8. Alternately, the pair of parting lines 3 may include two inclined parting lines 5 which are different in angle from one another. When the tyre 11 molded and cured by the tyre mold 1 travels on the ground, each discontinuous line 16 can disperse input received from the ground more effectively, thus improving uneven wear resistance and noise performance further.

The inclined parting lines 5, for example, may include at least one first inclined parting line 5A inclined in a first direction with respect to the tyre radial direction and at least one second inclined parting line 5B inclined in a second direction opposite to the first direction. Such inclined parting lines 5, when the tyre 11 travels on the ground, can disperse input received from the ground in different directions using the first inclined parting lines 5A and the second inclined parting lines 5B.

The first inclined parting line 5A is preferably inclined in the first direction at an angle $\theta 1$ equal to or less than 20 degrees with respect to the tyre axial direction. The second inclined parting line 5B is preferably inclined in the second direction at an angle $\theta 2$ equal to or less than 20 degrees with respect to the tyre axial direction. That is, the second inclined parting line 5B is inclined in the first direction at an angle $-\theta 2$ with respect to the tyre axial direction.

When the first inclined parting line 5A and the second inclined parting line 5B are adjacent in the tyre circumferential direction, the difference ($\theta 1+\theta 2$) between the angles of first inclined parting line 5A and the second inclined parting lines 5B is preferably equal to or less than 23 degrees. When the angle difference ($\theta 1+\theta 2$) exceeds 23 degrees, input received from the ground upon traveling varies widely, steering stability to be expected when being designed may not be exerted.

Preferably, the number of kinds of the parting lines 3 is equal to or more than 30% of the number of tread segments 2. Note that the number of kinds of the parting lines 3 include at least one of the first inclined parting line 5A, the second inclined parting line 5B and the non-inclined parting line 8. In addition, a parting line that is different in angle with respect to the tyre axial direction from others is counted as one kind. If the number of kinds of the parting lines 3 is less than 30% of the number of tread segments 2, when the tyre 11 travels on the ground, the effect that disperses input received from the ground tends to be deteriorated, thus leading to a risk that uneven wear resistance and noise performance are not improved.

When the number of tread segments 2 is few, a contact surface area of each tread segment 2 and the tyre 11 becomes large, the cured and molded tyre 11 may be deformed at the time that the tread segments 2 are opened after curing and molding. When the number of tread segments 2 becomes large, a structure of the tyre mold 1 tends to be complicated, leading to an increase of cost for manufacturing the tyre 11. From these viewpoints, it is preferable that the number of tread segments 2 is from 8 to 13.

The number of tread segments 2 of the tyre mold 1 corresponds to the total number of parting lines 3, and which also corresponds to the total number of transverse lines 16 of the tyre 11 which was molded and cured by the tyre mold 1. Thus, the total number of parting lines 3, as with the number of tread segments, is preferably from 8 to 13. In addition, the total number of transverse lines 16, as with the number of the parting lines 3, is preferably from 8 to 13.

The number of inclined parting lines 5 is preferably equal to or more than 50% of the number of tread segments 2. That is, the number of inclined parting lines 5 is equal to or more than 50% of the total number of parting lines 3. If the number of inclined parting lines 5 is less than 50% of the total number of parting lines 3, i.e., the number of tread segments 2, when the tyre 11 travels on the ground, the effect that disperses input received from the ground tends to be deteriorated, thus leading to a risk that uneven wear resistance and noise performance are not improved.

While the particularly preferable embodiments in accordance with the present disclosure have been described in detail, the present disclosure is not limited to the illustrated embodiments, but can be modified and carried out in various aspects.

Example

The tyre molds illustrated in FIG. 1 to FIG. 3 were prototyped based on the specification as shown in Table 1, and test tyres were also prototyped using the tyre molds. The test tyres were mounted on the four wheels of a test vehicle, and then uneven wear resistance and noise performance thereof were evaluated. Further, appearance of the test tyres was checked. The common specification and the testing methods for the test tyres are as follows.

Test vehicle: front wheel drive car with displacement of 1,500 cc
Tyre size: 185/60R15 84 H
Rim size: 15×6.0 J
Tyre inner pressure: 220 kPa Uneven Wear Resistance Test:

The test vehicle equipped with the test tyres was made to run for 8000 km, and then uneven wear of the test tyres was measured. The test results are shown in Table 1 using an index based on Ref. 1 being 100. The larger the value, the better the uneven wear resistance is.

Noise Performance Test:

When the test vehicle equipped with the test tyres was made to run at speed of 60 km/h, noise was measured. The test results are shown in Table 1 using an index based on Ref. 1 being 100. The smaller the value, the better the noise performance is.

Appearance Test:

Appearance of the test tyres was evaluated based on the observer's sense. The test results are shown in Table 1 using an index based on Ref. 1 being 100. The larger the value, the better the appearance is.

Table 1 shows the test results.

TABLE 1

|  | Ref. 1 | Ex. 1 | Ex. 2 | Ex. 3 | Ex. 4 | Ex. 5 | Ex. 6 | Ex. 7 |
|---|---|---|---|---|---|---|---|---|
| Number of kinds of parting lines | 1 | 1 | 2 | 2 | 2 | 2 | 5 | 1 |
| Non-inclined parting lines | presence | none | none | none | presence | none | none | none |
| Number of kinds of inclined parting lines | 0 | 1 | 2 | 2 | 1 | 2 | 5 | 1 |
| Angle of inclined parting line #1 with respect to first direction (deg.) | — | +10 | +5 | +10 | +10 | +10 | +2 | +40 |
| Angle of inclined parting line #2 with respect to first direction (deg.) | — | — | +10 | +20 | — | −10 | +4 | — |
| Angle of inclined parting line #3 with respect to first direction (deg.) | — | — | — | — | — | — | +6 | — |
| Angle of inclined parting line #4 with respect to first direction (deg.) | — | — | — | — | — | — | +8 | — |
| Angle of inclined parting line #5 with respect to first direction (deg.) | — | — | — | — | — | — | +10 | — |
| Uneven wear resistance (index) | 100 | 130 | 138 | 140 | 130 | 138 | 150 | 140 |
| Noise performance (index) | 100 | 85 | 81 | 80 | 85 | 81 | 75 | 80 |
| Appearance (index) | 100 | 150 | 150 | 150 | 140 | 130 | 150 | 130 |

From the test results, it is confirmed that the tyres of examples, as compared with the comparative examples, are superior to uneven wear resistance, noise performance and appearance. Hence, it is also confirmed that the tyre molds of examples, as compared with the comparative example, can mold tyres which are superior to uneven wear resistance, noise performance and appearance.

What is claimed is:

1. A tyre mold for curing and molding a tyre, the tyre mold comprising:
   a plurality of tread segments for molding a tread rubber of the tyre, the plurality of tread segments, upon being connected with one another in a mold circumferential direction, forming a tread molding-surface that is substantially continuous in the mold circumferential direction through parting lines that appear between adjacent tread segments,
   wherein the parting lines comprise
      one or more inclined parting lines inclined with respect to a mold axial direction,
      at least one first inclined parting line inclined in a first direction with respect to the mold axial direction over its entire length and
      at least one second inclined parting line inclined in a second direction opposite to the first direction over its entire length, and wherein the inclined parting lines extend straightly between ends in the mold axial direction of the tread molding-surface.

2. The tyre mold according to claim 1, wherein the tread segments each are provided on the tread molding-surface with one or more protrusions protruding inwardly in a mold radial direction,
wherein the protrusions comprise one or more main protrusions extending in the mold circumferential direction and one or more auxiliary protrusions extending in a direction crossing the main protrusions, and
wherein the inclined parting lines extend without crossing the auxiliary protrusions.

3. The tyre mold according to claim 1, wherein the inclined parting lines are inclined at an angle equal to or less than 20 degrees with respect to the mold axial direction.

4. The tyre mold according to claim 1, wherein the parting lines comprise at least two kinds of inclined parting lines inclined at different angles from one another with respect to the mold axial direction.

5. The tyre mold according to claim 1, wherein the parting lines comprise one or more non-inclined parting lines that extend straightly parallel to the mold axial direction.

6. The tyre mold according to claim 1,
wherein the parting lines comprise a pair of parting lines arranged adjacently in the mold circumferential direction, and
wherein the pair of parting lines is different in angle from one another with respect to the mold axial direction.

7. The tyre mold according to claim 6, wherein a difference between angles of the pair of parting lines is equal to or less than 23 degrees.

8. The tyre mold according to claim 1, wherein a number of the tread segments is from 8 to 13.

9. The tyre mold according to claim 1, wherein a number of the inclined parting lines is equal to or more than 50% of a number of the tread segments.

10. The tyre mold according to claim 1, wherein the inclined parting lines extend straightly over the entire width in the mold axial direction of the tread molding-surface in a development view of the tread molding-surface.

11. A tyre mold for curing and molding a tyre, the tyre mold comprising:
a plurality of tread segments for molding a tread rubber of the tyre, the plurality of tread segments, upon being connected with one another in a mold circumferential direction, forming a tread molding-surface that is substantially continuous in the mold circumferential direction through parting lines that appear between adjacent tread segments,
wherein the parting lines comprise one or more inclined parting lines inclined with respect to a mold axial direction and one or more non-inclined parting lines that extend straightly parallel to the mold axial direction,
wherein the inclined parting lines extend straightly between ends in the mold axial direction of the tread molding-surface,
wherein the inclined parting lines comprise
at least one first inclined parting line inclined in a first direction with respect to the mold axial direction and
at least one second inclined parting line inclined in a second direction opposite to the first direction, and
wherein the inclined parting lines are inclined at an angle equal to or less than 20 degrees with respect to the mold axial direction.

12. The tyre mold according to claim 11,
wherein the tread segments each are provided on the tread molding-surface with one or more protrusions protruding inwardly in a mold radial direction,
wherein the protrusions comprise one or more main protrusions extending in the mold circumferential direction and one or more auxiliary protrusions extending in a direction crossing the main protrusions, and
wherein the inclined parting lines extend without crossing the auxiliary protrusions.

13. The tyre mold according to claim 11, wherein the parting lines comprise at least two kinds of inclined parting lines inclined at different angles from one another with respect to the mold axial direction.

14. The tyre mold according to claim 11,
wherein the parting lines comprise a pair of parting lines arranged adjacently in the mold circumferential direction, and
wherein the pair of parting lines is different in angle from one another with respect to the mold axial direction.

15. The tyre mold according to claim 11, wherein a number of the inclined parting lines is equal to or more than 50% of a number of the tread segments.

16. A method for manufacturing a tyre, the method comprising curing and molding a tire using the tyre mold according to claim 11.

17. A tyre comprising
a tread rubber molded and cured using the tyre mold according to claim 11, the tread rubber being provided with transverse lines molded by the parting lines,
wherein the transverse lines comprise one or more inclined transverse lines inclined with respect to a tire axial direction.

18. A tyre mold for curing and molding a tyre, the tyre mold comprising:
a plurality of tread segments for molding a tread rubber of the tyre, the plurality of tread segments, upon being connected with one another in a mold circumferential direction, forming a tread molding-surface that is substantially continuous in the mold circumferential direction through parting lines that appear between adjacent tread segments,
wherein a number of the plurality of tread segments is from 8 to 13,
wherein the parting lines comprise one or more inclined parting lines inclined with respect to a mold axial direction,
wherein the inclined parting lines extend straightly between ends in the mold axial direction of the tread molding-surface,
wherein the inclined parting lines are inclined at an angle equal to or less than 20 degrees with respect to the mold axial direction, and
wherein an inner surface in a mold radial direction of each of the plurality of segments is not divided in the mold circumferential direction so as not to have any parting lines.

19. The tyre mold according to claim 18,
wherein the tread segments each are provided on the tread molding-surface with one or more protrusions protruding inwardly in a mold radial direction,
wherein the protrusions comprise one or more main protrusions extending in the mold circumferential direction and one or more auxiliary protrusions extending in a direction crossing the main protrusions, and
wherein the inclined parting lines extend without crossing the auxiliary protrusions.

20. The tyre mold according to claim 18, wherein the parting lines comprise at least two kinds of inclined parting lines inclined at different angles from one another with respect to the mold axial direction.

21. The tyre mold according to claim 18,
wherein the parting lines comprise a pair of parting lines arranged adjacently in the mold circumferential direction, and
wherein the pair of parting lines is different in angle from one another with respect to the mold axial direction.

22. The tyre mold according to claim 18, wherein a number of the inclined parting lines is equal to or more than 50% of a number of the tread segments.

* * * * *